(12) United States Patent
Baccouche et al.

(10) Patent No.: US 10,486,558 B1
(45) Date of Patent: Nov. 26, 2019

(54) TURNTABLE ASSEMBLY FOR A VEHICLE

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Johnathan Andrew Line, Northville, MI (US); Marcos Silva Kondrad, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/021,584

(22) Filed: Jun. 28, 2018

(51) Int. Cl.
*B60N 2/10* (2006.01)
*B60N 2/14* (2006.01)
*B60N 2/08* (2006.01)
*B60N 2/005* (2006.01)

(52) U.S. Cl.
CPC ............ *B60N 2/146* (2013.01); *B60N 2/005* (2013.01); *B60N 2/08* (2013.01)

(58) Field of Classification Search
CPC . B60N 2/146; B60N 2/14; B60N 2/04; B60N 2/005; B60N 2/08
USPC ................... 297/344.22, 257, 344.1, 344.21
See application file for complete search history.

(56) References Cited

U.S. PATENT DOCUMENTS

| | | | |
|---|---|---|---|
| 2,426,582 A | 9/1947 | Austin | |
| 2,472,349 A * | 6/1949 | Smith | B61D 33/00 248/425 |
| 4,341,415 A | 7/1982 | Braun et al. | |
| 5,000,505 A | 3/1991 | Kawashita et al. | |
| 5,636,884 A | 6/1997 | Ladetto et al. | |
| 5,951,106 A | 9/1999 | Hirama et al. | |
| 6,027,170 A * | 2/2000 | Benz | B60N 2/14 248/425 |
| 6,168,234 B1 | 1/2001 | Haynes et al. | |
| 6,457,765 B1 | 10/2002 | Bergquist et al. | |
| 6,666,514 B2 | 12/2003 | Muraishi et al. | |
| 6,981,746 B2 | 1/2006 | Chung et al. | |
| 7,108,325 B2 | 9/2006 | Williamson et al. | |
| 7,357,451 B2 | 4/2008 | Bendure et al. | |
| 7,658,258 B2 | 2/2010 | Denney | |
| 7,677,629 B2 * | 3/2010 | Akiya | B60N 2/01 296/64 |
| 7,753,444 B2 * | 7/2010 | Vallentin | B60N 2/2821 297/256.12 |
| 7,950,740 B2 | 5/2011 | Bunea et al. | |
| 8,079,641 B2 * | 12/2011 | Lung | B60N 2/14 297/344.24 |
| 8,702,169 B2 * | 4/2014 | Abadilla | B60N 2/062 297/256.12 |
| 9,114,730 B1 | 8/2015 | Hudson et al. | |
| 9,718,378 B2 * | 8/2017 | Schulz | B60N 2/0244 |
| 2003/0083063 A1 * | 5/2003 | Wang | H01Q 1/3275 455/427 |
| 2009/0195037 A1 | 8/2009 | Plavetich et al. | |

(Continued)

*Primary Examiner* — Mark R Wendell
(74) *Attorney, Agent, or Firm* — Vichit Chea; Price Heneveld LLP (57) ABSTRACT

A turntable assembly for a vehicle includes a base that couples to a support structure, a network of rails that includes lateral rails, longitudinal rails, and diagonal rails, and a locking mechanism that is coupled to the base and is actuatable between engaged and disengaged positions with the support structure.

20 Claims, 7 Drawing Sheets

(56) References Cited

U.S. PATENT DOCUMENTS

| | | | |
|---|---|---|---|
| 2010/0001169 A1* | 1/2010 | Armo | B60N 2/06 |
| | | | 248/636 |
| 2012/0235006 A1* | 9/2012 | Sailer | B60N 2/01 |
| | | | 248/429 |
| 2013/0147847 A1* | 6/2013 | Koseki | B60R 11/0235 |
| | | | 345/660 |
| 2013/0193732 A1* | 8/2013 | Brand | B60N 2/14 |
| | | | 297/344.21 |
| 2016/0332539 A1* | 11/2016 | Rawlinson | B60N 2/0244 |
| 2017/0043688 A1* | 2/2017 | Gallagher | B60N 2/14 |
| 2017/0120776 A1* | 5/2017 | Slungare | B60N 2/14 |
| 2019/0134515 A1* | 5/2019 | Freedman | A63G 31/16 |

\* cited by examiner

TURNTABLE ASSEMBLY FOR A VEHICLE

FIELD OF THE DISCLOSURE

The present disclosure generally relates to a vehicle. More specifically, the present disclosure relates to a turntable assembly for a vehicle.

BACKGROUND OF THE INVENTION

Vehicles are often provided with a plurality of seats for supporting users. Conventional seats are often provided with an ability to adjust a horizontal position of the seat to accommodate users of various heights and various comfort preferences. However, additional solutions are needed for seats in vehicles that enable greater degrees of customization to the user.

SUMMARY OF THE INVENTION

According to a first aspect of the present disclosure, a turntable assembly for a vehicle includes a base that couples to a support structure. A network of rails includes lateral rails, longitudinal rails, and diagonal rails. A locking mechanism is coupled to the base and is actuatable between engaged and disengaged positions with the support structure.

Embodiments of the first aspect of the present disclosure can include any one or a combination of the following features:
- the turntable for a vehicle also includes a closeout panel positioned as a top surface of the turntable assembly;
- the turntable for a vehicle also includes a collar that engages with at least one of the base and the support structure to provide a low friction surface for rotational motion of the turntable assembly;
- the turntable for a vehicle also includes a rotation mechanism that includes a motor and a plurality of rollers, wherein the rollers passively rotate as the rotation mechanism imparts rotational motion to the turntable assembly;
- the turntable for a vehicle also includes one or more seating assemblies coupled to the network of rails;
- the one or more seating assemblies are coupled to the network of rails by guide tracks, wherein the seating assemblies are horizontally actuatable along the guide tracks relative to the network of rails; and
- the network of rails converge on a plurality of connecting plates that are spaced about a perimeter of the base.

According to a second aspect of the present disclosure, a turntable assembly for a vehicle includes a base that couples to a support structure. A network of rails converge on a plurality of connecting plates that are spaced about a perimeter of the base. A locking mechanism is coupled to the base and is actuatable between engaged and disengaged positions with the support structure.

Embodiments of the second aspect of the present disclosure can include any one or a combination of the following features:
- the network of rails includes lateral rails, longitudinal rails, and diagonal rails;
- the turntable assembly for a vehicle also includes a closeout panel positioned as a top surface of the turntable assembly;
- the turntable assembly for a vehicle also includes a collar that engages with at least one of the base and the support structure to provide a low friction surface for rotational motion of the turntable assembly.
- the turntable assembly for a vehicle also includes a rotation mechanism that includes a motor and a plurality of rollers, wherein the rollers passively rotate as the rotation mechanism imparts rotational motion to the turntable assembly;
- the turntable assembly for a vehicle also includes one or more seating assemblies coupled to the network of rails;
- the one or more seating assemblies are coupled to the network of rails by guide tracks, wherein the seating assemblies are horizontally actuatable along the guide tracks relative to the network of rails; and
- the network of rails converge on a plurality of connecting plates that are spaced about a perimeter of the base.

According to a third aspect of the present disclosure, a turntable assembly for a vehicle includes a support structure and a base that couples to the support structure. A collar engages with the base to provide a low friction surface for rotational motion of the turntable assembly. A closeout panel is positioned as a top surface of the turntable assembly. A network of rails includes lateral rails, longitudinal rails, and diagonal rails. The network of rails converge on a plurality of connecting plates that are spaced about a perimeter of the base. A locking mechanism is coupled to the base and is actuatable between engaged and disengaged positions with the support structure.

Embodiments of the third aspect of the present disclosure can include any one or a combination of the following features:
- the turntable assembly for a vehicle also includes a rotation mechanism that includes a motor and a plurality of rollers, wherein the rollers passively rotate as the rotation mechanism imparts rotational motion to the turntable assembly;
- the turntable assembly for a vehicle also includes one or more seating assemblies coupled to the network of rails;
- the one or more seating assemblies are coupled to the network of rails by guide tracks, wherein the seating assemblies are horizontally actuatable along the guide tracks relative to the network of rails; and
- the one or more seating assemblies includes a first seating assembly and a second seating assembly, wherein the first and second seating assemblies remain parallel to one another regardless of a rotational position of the turntable assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
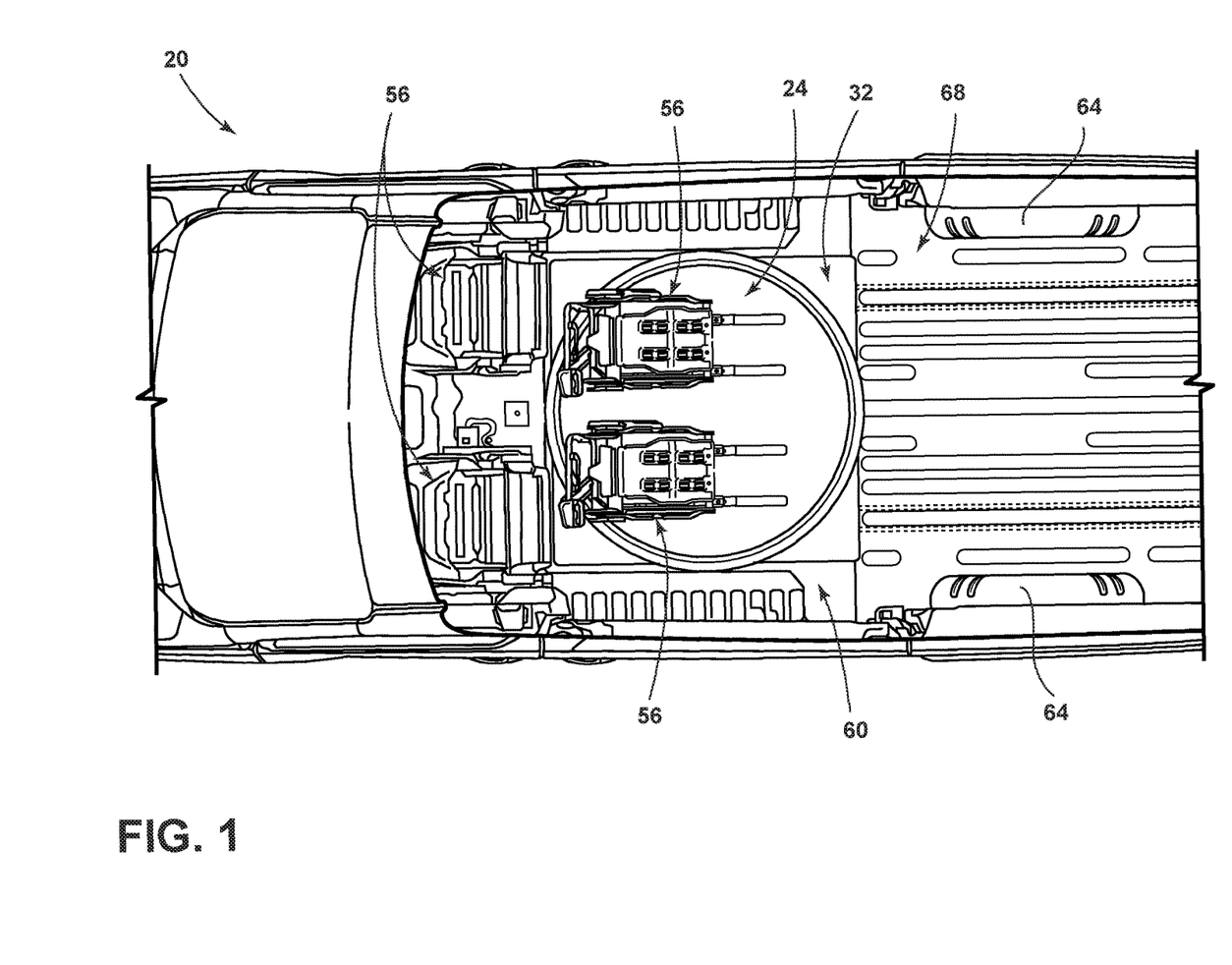
FIG. 1 is a top view of a turntable assembly installed in a vehicle, illustrating a rear-facing orientation, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a turntable assembly for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-8B, a vehicle is generally designated by numeral 20. In various examples, the vehicle 20 may be a motor vehicle. A turntable assembly 24 for the vehicle 20 includes a base 28 that couples to a support structure 32 of the vehicle 20. A network of rails 36 is provided that can include lateral rails 40, longitudinal rails 44, and diagonal rails 48. A locking mechanism 52 is coupled to the base 28 and is actuatable between an engaged position and a disengaged position with the support structure 32.

Referring again to FIG. 1, the vehicle 20 is equipped with one or more seating assemblies 56 that are coupled to the network of rails 36. The vehicle 20 may also include seating assemblies 56 that are not coupled to the network of rails 36 or the turntable assembly 24. For example, one or more seating assemblies 56 can be provided within the vehicle 20 at locations that are vehicle-forward and/or vehicle-rearward of the turntable assembly 24. The support structure 32 can be coupled to an underbody 60 and/or frame of the vehicle 20. Alternatively, the support structure 32 can be integrally formed in the underbody 60. Accordingly, loads experienced by the turntable assembly 24, whether from impact events (vehicle-to-vehicle collisions, road hazards, vehicle-to-object collisions, etc.) or occupant weight, are transferred to the underbody 60 of the vehicle 20. The dimensions of the support structure 32 can be configured to fit within a lateral distance between a pair of rear wheel wells 64 such that a plurality of the turntable assemblies 24 can be installed within a cabin 68 of the vehicle 20. For example, the turntable assembly 24 can be installed in the cabin 68 of a vehicle 20 that is capable of holding three rows of seating assemblies 56. Accordingly, the turntable assembly 24 can be installed as a first row of seating assemblies 56, a second row of seating assemblies 56, and/or a third row of seating assemblies 56. Regardless of the number of turntable assemblies 24 that are employed in a given vehicle 20, the turntable 24 is configured to provide various rotational positions to an entire row of seating assemblies 56 to enable occupants to assume rotational positions that make conversation easier, allow the occupants to view scenery that is exterior to the vehicle 20 out of side, front, or rear windows, and so on. The rotational positions of the turntable assembly 24 can also be utilized to make ingress and egress from the cabin 68 easier.

Figure 2A:
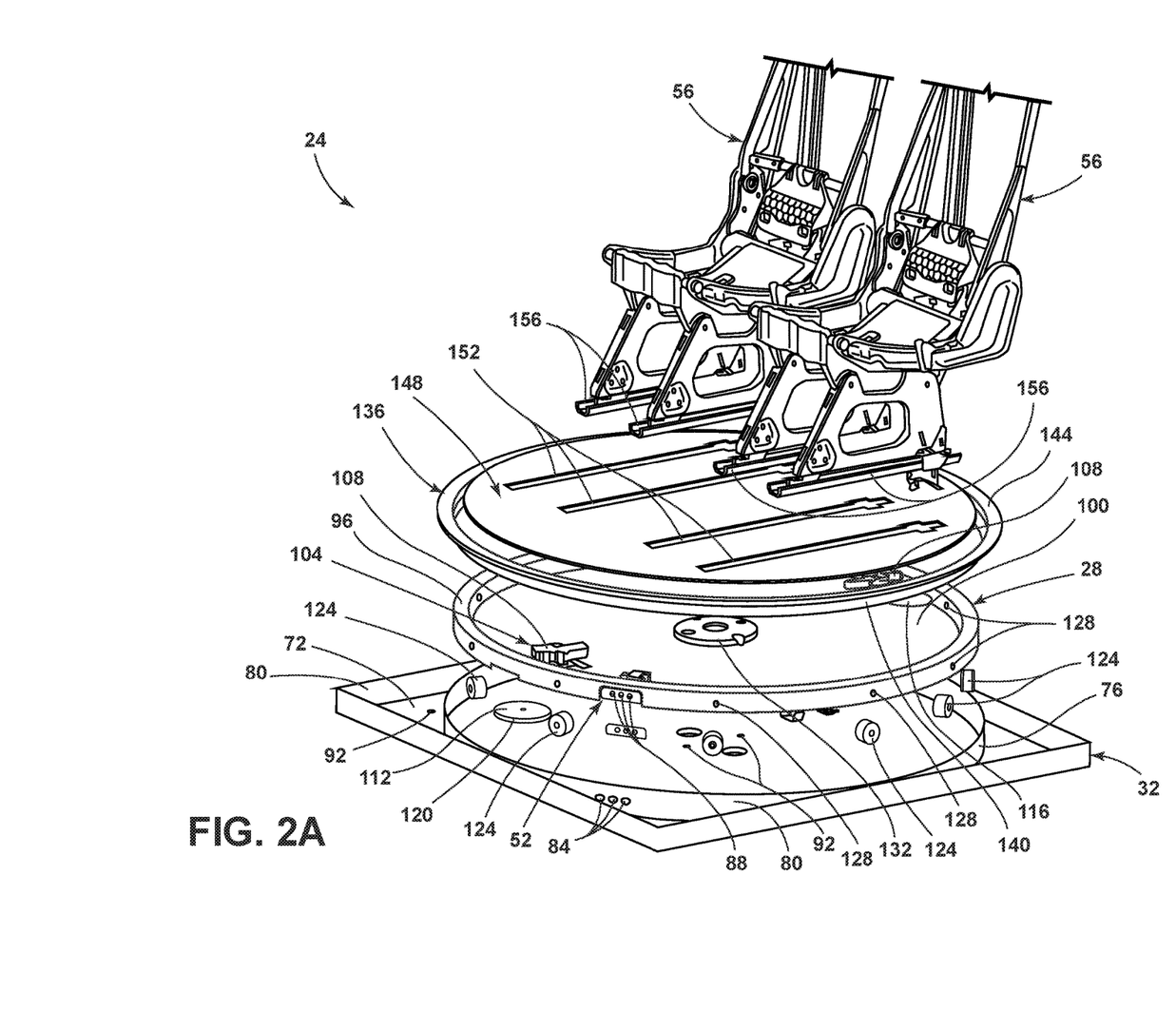
FIG. 2A is an exploded view of the turntable assembly, illustrating a support structure, a base, and a plurality of seating assemblies, according to one example.
Figure 2B:
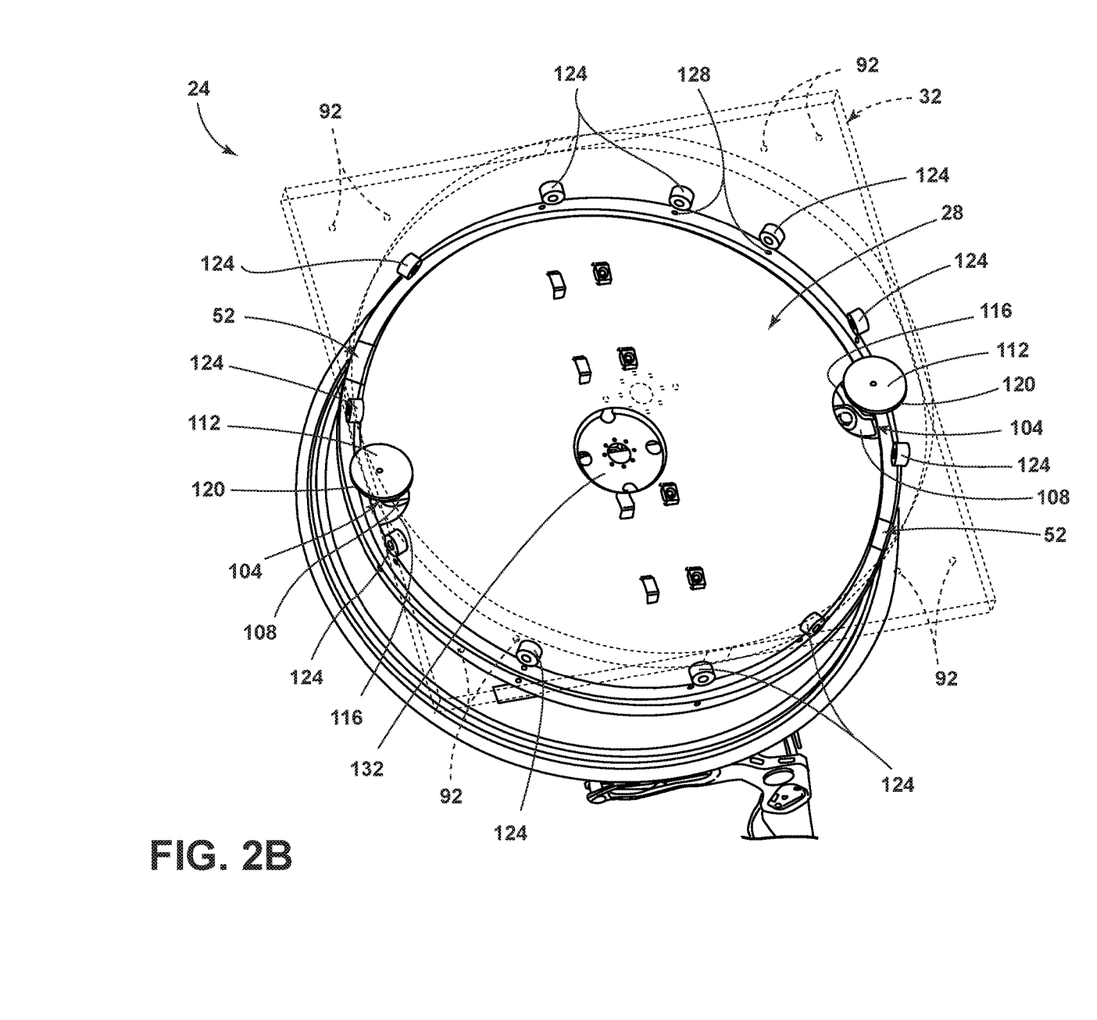
FIG. 2B is a bottom perspective view of the turntable assembly, illustrating an underside of the base, according to one example.

Referring now to FIGS. 2A and 2B, the support structure 32 may have an outer portion 72 that is generally rectangular in shape and an inner portion 76 that is generally circular in shape. The outer portion 72 and the inner portion 76 can be provided with walls 80 that define a perimeter of the shapes of the outer portion 72 and the inner portion 76. The walls 80 can have a height that generally corresponds to a thickness of the remaining components of the turntable assembly 24 such that a substantially flat and continuous surface is provided within the area of the outer portion 72 and/or the inner portion 76. In various examples, at least one of the walls 80 of the inner portion 76 may define lock apertures 84 that receive locking pins 88. The locking pins 88 make up at least a portion of the locking mechanism 52. The turntable assembly 24 can be equipped with a plurality of the locking mechanisms 52 to aid in distribution of impact and weight loads. The support structure 32 is provided with floor apertures 92 that are utilized to fasten or mount the support structure 32 to the underbody 60 of the vehicle 20. Accordingly, the support structure 32 is fixed relative to the underbody 60.

Referring again to FIGS. 2A and 2B, the base 28 defines a raised portion 96 and a recessed portion 100. A height difference between the raised portion 96 and the recessed portion 100 provides an area within the surface area of the base 28 where components can be mounted with enough clearance from other components to prevent interference between components and enable the presentation to a user of a flat surface to the turntable assembly 24. The components that are mounted within the recessed portion 100 include the one or more locking mechanisms 52 and at least a portion of one or more rotation mechanisms 104. The rotation mechanism 104 can include a motor 108 and a rotor 112. The motor 108 can be mounted within the recessed portion 100 proximate a motor aperture 116 that is defined by the base 28. A driveshaft of the motor 108 may extend in a downward direction from the motor 108 to couple with the rotor 112. The motor aperture 116 can include openings in the raised portion 96 and the recessed portion 100 of the base 28. Accordingly, the rotor 112 can be substantially contained within the opening in the recessed portion 100 and partially extend laterally through the opening in the raised portion 96. By so arranging the motor 108 and the rotor 112, the majority of the rotation mechanism 104 is contained within, and protected by, the structure of the base 28 defined by the recessed portion 100. An engagement edge 120 of the rotor 112 can at least partially extend laterally through the opening in the raised portion 96 to engage with an interior surface of the walls 80 of the inner portion 76 of the support structure 32. The engagement edge 120 transmits rotary motion imparted to the rotor 112 by the motor 108 to the base 28 by inducing rotational motion of the base 28 relative to the support structure 32. A plurality of rollers 124 may also be provided to distribute the weight of the turntable assembly 24 during rotational motion and when the turntable assembly 24 is stationary. The plurality of rollers 124 are passive rollers and are not actively driven by a motor. It is contemplated that the plurality of rollers 124 can be actively driven by a motor, however, the complexity and weight of the turntable assembly 24 would likely increase to an undesirable level. The plurality of rollers 124 can be mounted in an underside of the raised portion 96 and the raised portion 96 can accordingly be configured to receive the plurality of rollers 124 in a manner that provides adequate clearance between surfaces of the underside of the raised portion 96 such that binding of the plurality of rollers 124 is prevented. In various examples, the plurality of rollers 124 may be coupled to the raised portion 96 by axle pins that pass through axle pin apertures 128 provided in the raised portion 96. The axle pins define rotational axes of the individual rollers 124 of the plurality of rollers 124. In some examples, the recessed portion 100 of the base 28 is provided with a central portion 132 that has either a generally convex profile or a generally concave profile. In such examples, the central portion 132 of the base 28 can engage with a complimentary portion on the support structure 32 to aid in retention of the base 28 as well as positioning of the base 28 relative to the support structure 32.

Referring further to FIGS. 2A and 2B, a collar 136 engages with at least one of the base 28 and the support structure 32. The collar 136 can provide a low friction surface for rotational motion of the turntable assembly 24. For example, the collar 136 can engage with the base 28 such that the collar 136 substantially covers an upper surface or top side of the raised portion 96. The collar 136 may additionally extend over a gap between the base 28 and the walls 80 of the inner portion 76 to prevent debris, cargo items, shoe heels, fingers, and so on from entering the turntable assembly 24. Accordingly, the components of the turntable assembly 24, especially the moving components, are protected from foreign objects while hazards to the user or occupant are also minimized. The gap between the base 28 and the walls 80 of the inner portion 76 can be due to manufacturing tolerances and/or tolerances that prevent binding of the base 28 as rotational motion is executed. The collar 136 can be made of a low friction material, including, but not limited to, a composite and/or a polymer. The collar 136 may include a vertical section 140 and a horizontal section 144. The vertical section 140 may be tapered toward a center point of the collar 136 such that a lower extreme of the vertical section 140 is radially inward from an upper extreme of the vertical section 140. In some examples, the collar 136 engages with an interior surface of the raised portion 96. Accordingly, providing the vertical section 140 with a taper ensures a snug fit and retention of the collar 136 while allowing for manufacturing tolerances.

Referring still further to FIGS. 2A and 2B, a closeout panel 148 is positioned as a top surface of the turntable assembly 24. The closeout panel 148 defines a plurality of guide track apertures 152. The guide track apertures 152 are parallel to one another. In the depicted example, there are four of the guide track apertures 152 that represent two pairs of the guide track apertures 152. Each pair of guide track apertures 152 is configured to permit a passing through of a corresponding pair of guide tracks 156. The pairs of guide tracks 156 receive structures on the seating assemblies 56 that slidably couple to the guide tracks 156 and enable horizontal actuation along the guide tracks 156. The guide tracks 156 can couple to the network of rails 36 (see FIGS.

Figures 3, 4:
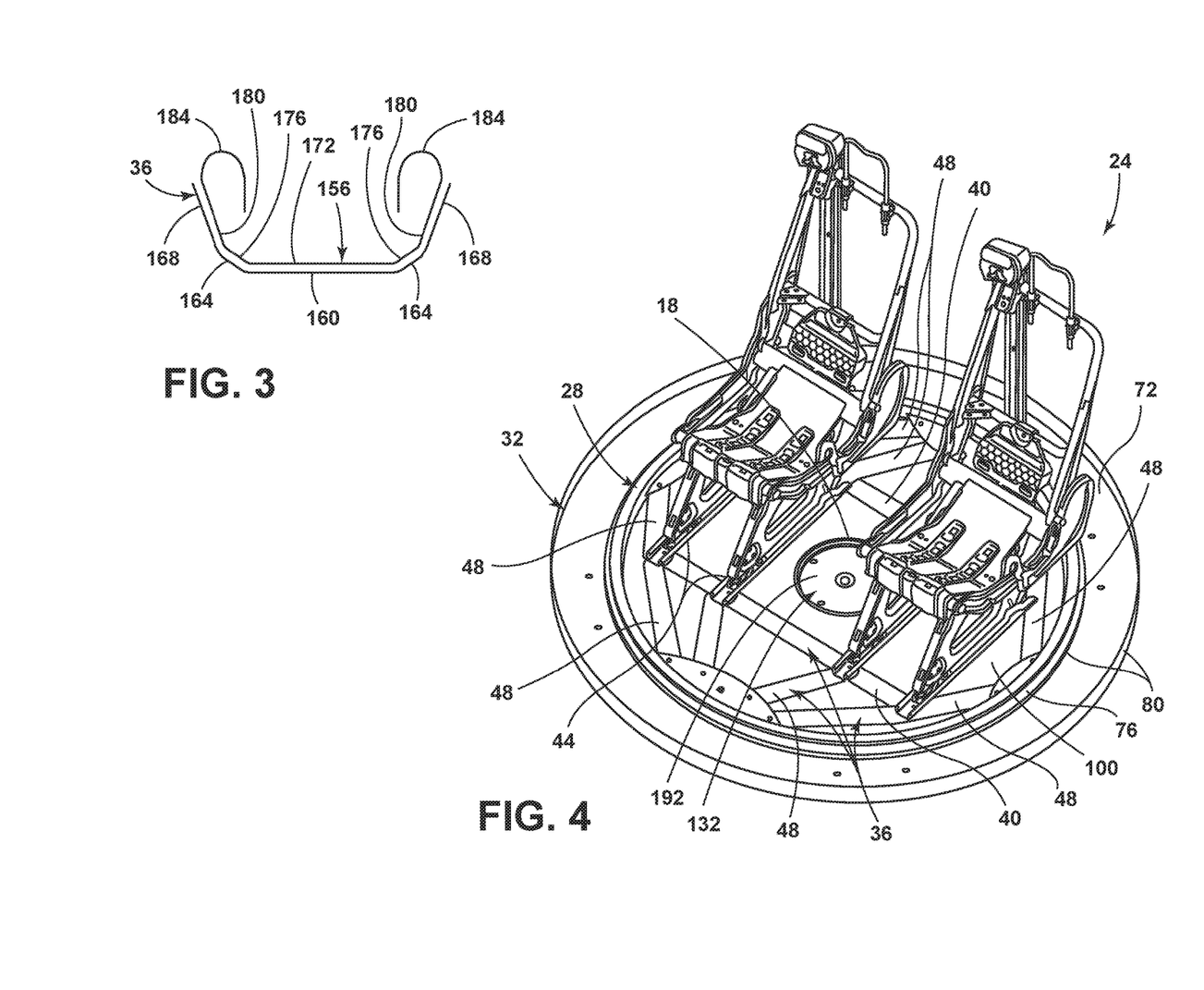
FIG. 3 is profile view of a rail from a network of rails receiving a guide track, according to one example.
FIG. 4 is a top perspective view of the turntable assembly, illustrating the seating assemblies coupled to the network of rails, according to one example.
Figure 5:
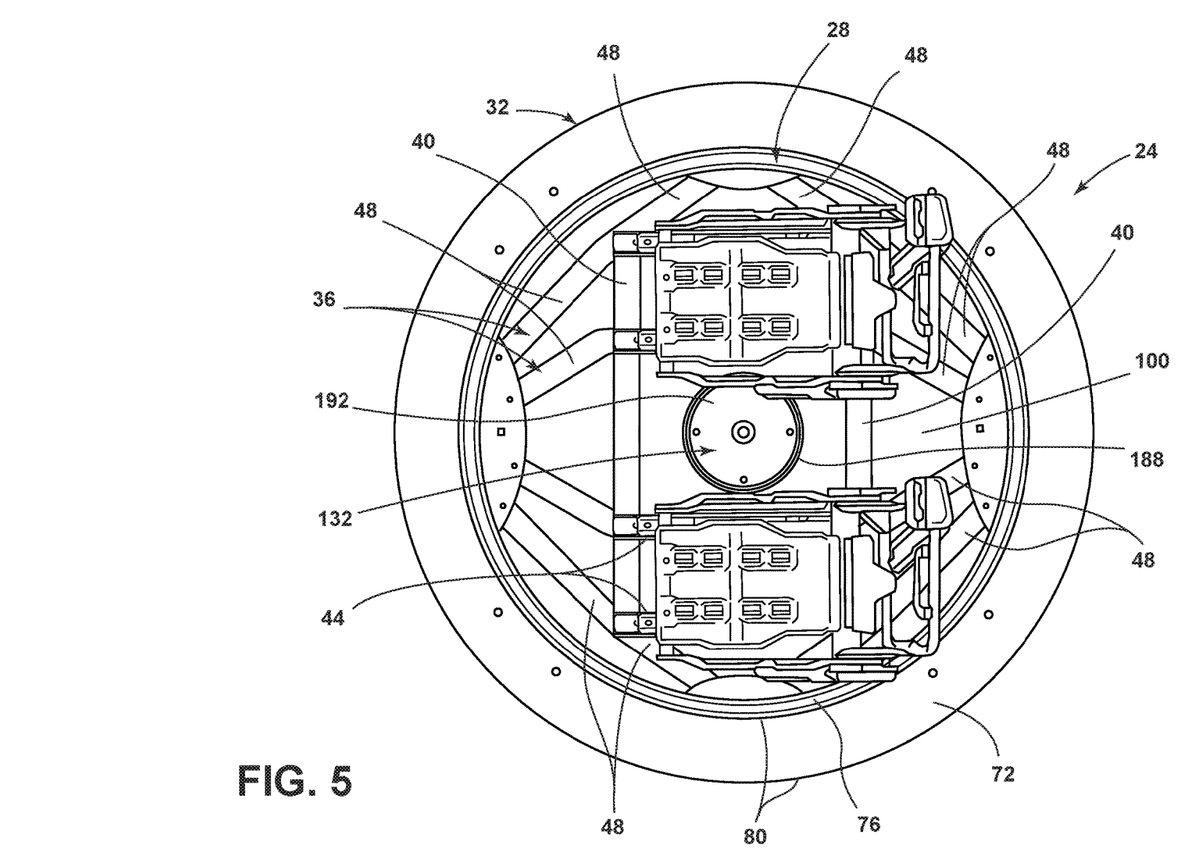
FIG. 5 is a top view of the turntable assembly, illustrating the network of rails and a plurality of connecting plates, according to one example.

4 and 5). Accordingly, the seating assemblies 56 can be actuated in a horizontal direction along the guide tracks 156 relative to the network of rails 36. Said another way, the guide tracks 156 are fixed relative to the network of rails 36. However, the seating assemblies 56 are movable relative to the guide tracks 156.

Referring to FIG. 3, the network of rails 36 receive the guide tracks 156. The rails that make up the network of rails 36 and the guide tracks 156 are generally U-shaped when sectioned as shown in FIG. 3. In one example, the guide tracks 156 are associated with the longitudinal rails 44. For brevity, the relationship between the guide tracks 156 and the network of rails 36 is discussed with reference to the longitudinal rails 44, however, the present disclosure is not so limited. Accordingly, the guide tracks 156 can be associated with the lateral rails 40 and/or the diagonal rails 48 without departing from the concepts disclosed herein. The rails of the network of rails 36 are defined by a center region 160 that is generally planar along a horizontal plane. The center region 160 is symmetrically flanked on either side by a first angled portion 164 and a second angled portion 168. The guide tracks 156 are defined by a center area 172 that is symmetrically flanked on either side by a first angled section 176, a second angled section 180, and an arcuate end 184. The center area 172 of the guide track 156 corresponds with the center region 160 of the longitudinal rail 44. The first and second angled portions 164, 168 of the longitudinal rail 44 correspond with the first and second angled sections 176, 180 of the guide track 156, respectively. The arcuate ends 184 of the guide tracks 156 define terminal regions of the guide track 156. The arcuate ends 184 can serve as a retention and coupling feature to a portion of the seating assembly 56 that engages with the guide tracks 156. For example, such a coupling feature on the seating assembly 56 can be configured with a profile that engages in a mating fashion with the arcuate ends 184 such that an upturned portion of the coupling feature fits between an interior surface of the arcuate end 184 and an adjacent surface of the second angled section 180 on either side of the guide track 156. The longitudinal rail 44 follows the contours of the guide track 156 and a height of the second angled portion 168 of the longitudinal rail 44 substantially corresponds with a height of the second angled section 180 of the guide track 156. Accordingly, during horizontal impact loads to the vehicle 20, the turntable assembly 24, the seating assembly 56, the longitudinal rail 44, and/or the guide track 156, the guide track 156 is laterally retained within the longitudinal rail 44 and unintentional decoupling of the guide track 156 from the longitudinal rail 44 is prevented.

Referring now to FIGS. 4 and 5, in some examples the outer portion 72 of the support structure 32 may be generally circular in shape. Additionally, the space between the walls 80 of the outer portion 72 and the inner portion 76 of the support structure 32 can be greater than the space depicted above in FIGS. 2A and 2B. The central portion 132 of the base 28 may be provided as a base aperture 188 that is defined by the recessed portion 100 of the base 28. The base aperture 188 can receive a raised platform 192 of the support structure 32. The raised platform 192 extends through the base aperture 188 and can serve, in one aspect, as a retention feature for maintaining a desired position of the base 28 relative to the support structure 32. The raised platform 192 may include a turned-over edge about a perimeter or circumference of the raised platform 192 that can engage with the base aperture 188 in a snap-fit manner. For example, lowering the base aperture 188 onto the raised platform 192 and providing sufficient pressure to the base 28 can result in a momentary and reversible deformation of the turned-over edge. Then, once the base 28 and base aperture 188 have cleared the turned-over edge, the turned-over edge reassumes the intended position and dimensions by expanding over a top surface of the base 28 that is immediately proximate to the base aperture 188. Accordingly, the raised platform 192 may also provide at least some vertical retention force to the base 28. The interaction between the central portion 132 and the support structure 32 or the interaction between the raised platform 192 and the base aperture 188 may be the sole coupling between the base 28 and the support structure 32 such that rotational freedom of the base 28 relative to the support structure 32 is maintained.

Figure 6:
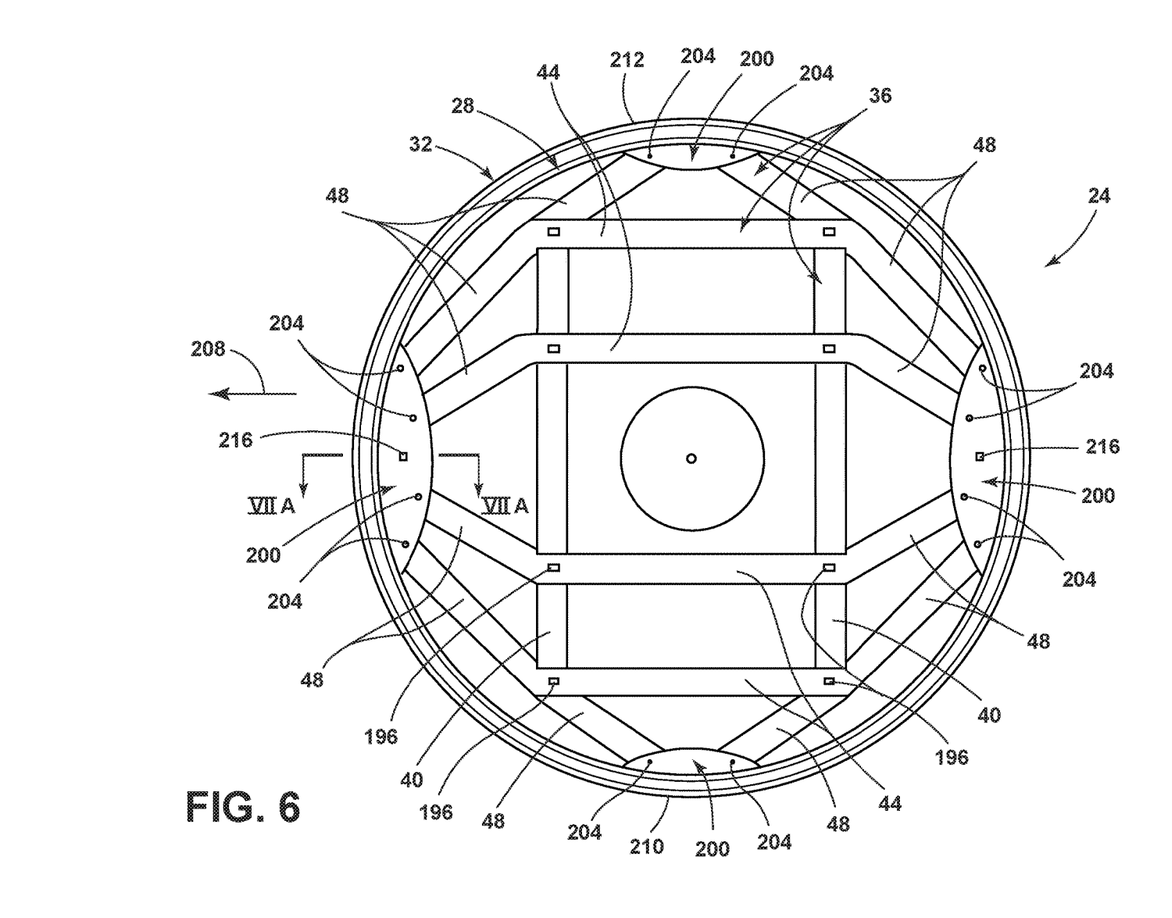
FIG. 6 is a top view of the turntable assembly, illustrating a layout of the network of rails, according to one example.
Figure 7A:
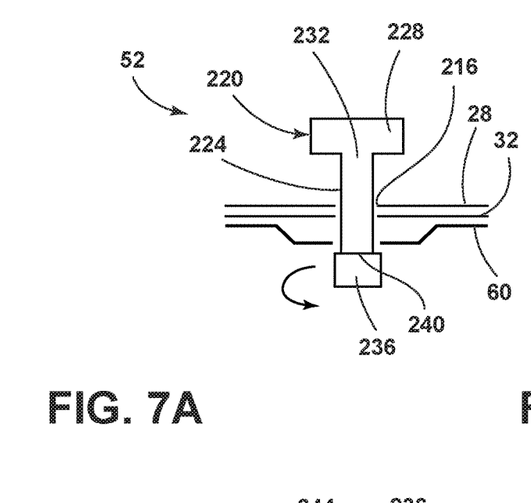
FIG. 7A is a cross-sectional view, taken at line VIIA-VIIA of FIG. 6, illustrating a locking mechanism in an unlocked configuration, according to one example.
Figure 7B:
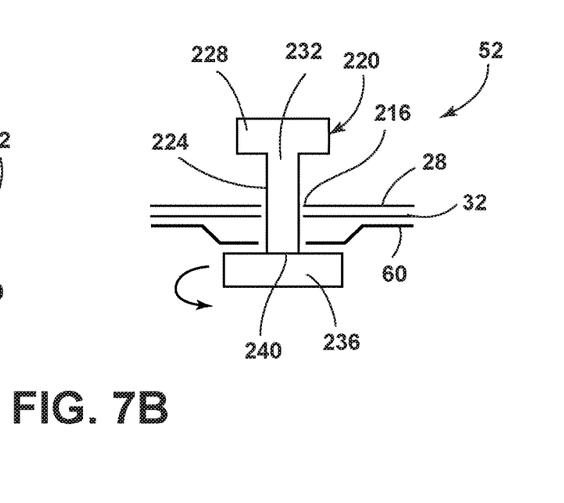
FIG. 7B is a cross-sectional view, taken at line VIIA-VIIA of FIG. 6, illustrating the locking mechanism in a locked configuration, according to one example.
Figure 8A:
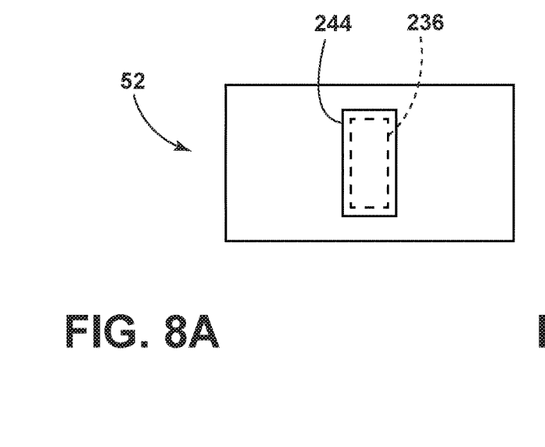
FIG. 8A is a top view of the locking mechanism, illustrating a T-shaped bolt interacting with a slot to define the unlocked configuration, according to one example.
Figure 8B:
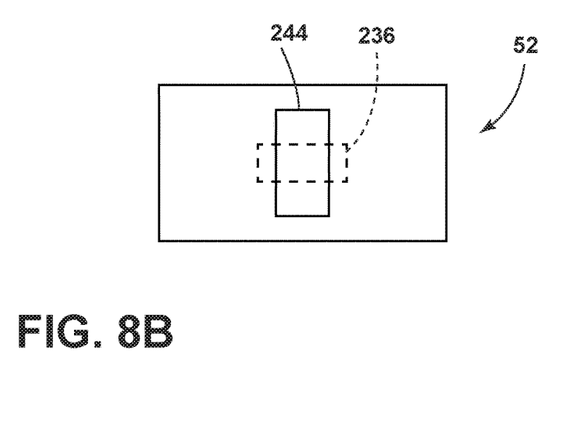
FIG. 8B is a top view of the locking mechanism, illustrating the T-shaped bolt interacting with the slot to define the locked configuration, according to one example.

Referring to FIG. 6, the longitudinal rails 44 define guide track coupling apertures 196 that are utilized to secure the guide tracks 156 to the longitudinal rails 44. The network of rails 36 can be provided with built-in crumple zones at various junctions between the individual rails. For example, junctions or inflection points between the diagonal rails 48 and the lateral or longitudinal rails 40, 44 are configured to absorb at least some impact energy that can result during impact events, such as vehicle-to-vehicle or vehicle-to-object impact events. Accordingly, as an impact event encroaches on the turntable assembly 24 and begins to deform the turntable assembly 24, the junctions or points where the diagonal rails 48 meet the lateral and longitudinal rails 40, 44 cause the impact energy to be directed to an intermediate point along the length of the diagonal rails 48 such that the diagonal rails 48 bend or crumple at the intermediate point. Such a crumpling or impact absorption can be the case for not only the diagonal rails 48 that are nearest to a point of impact, but also for the diagonal rails 48 that are immediately opposite the point of impact. Additionally, the diagonal rails 48 that are positioned in an offset relationship to the impact line (e.g., the diagonal rails 48 to the right and left of the lateral rails 40 in FIG. 6) can absorb impact energy by deforming at an intermediate point along their length as the impact energy is transferred across the turntable assembly 24. Therefore, the lateral rails 40 that separate the seating assemblies 56, and by extension the occupants, and the longitudinal rails 44 may maintain their structural integrity during an impact event such that the occupants of the seating assemblies 56 are prevented from experiencing a full force of the impact event.

Referring again to FIG. 6, the network of rails 36 converge on a plurality of connecting plates 200. The connecting plates 200 are spaced about a perimeter of the base 28. The network of rails 36 are coupled to the connecting plates 200 by connecting plate fastener apertures 204. Arrow 208 designates a travel direction of the vehicle 20. The most common positions of the turntable assembly 24 are considered to be with occupants of the seating assemblies 56 facing forward or rearward in the cabin 68 of the vehicle 20. Additionally, front end and rear end collisions tend to have a greater probability of occurring with greater energy transfer (e.g., higher speeds, more direct rather than tangential forces, etc.). Accordingly, the front and rear connecting plates 200 have a greater number of the network of rails 36 converging thereupon to increase an energy absorption potential in those regions. Comparatively, side impact events have a tendency to occur at lower speeds (e.g., surface street speeds) than front or rear end collisions have the potential for (e.g., highway or interstate speeds). Therefore, the connecting plates 200 that are positioned at the sides of the turntable 24 that correspond to the sides of the vehicle 20 have fewer rails from the network of rails 36 converging thereupon. However, the network of rails 36 that converge upon the connecting plates 200 at the front and rear of the turntable assembly 24 aid in energy absorption when an impact event is experienced that exceeds the energy absorption capabilities of the diagonal rails 48 at the sides of the turntable assembly 24.

Referring further to FIG. 6, in the event of a side-impact collision, such as a left side 210 of the turntable assembly 24, then the diagonal rails 48 that converge upon the connecting plate 200 on the left side 210 begin to deform at an intermediate point along their length. As the impact continues to penetrate into the side of the vehicle 20, impact energy may begin to transfer into one or more of the lateral rails 40 and/or the diagonal rails 48 that converge upon the connecting plates 200 at the front and/or rear of the turntable assembly 24. The transfer of impact energy into the diagonal rails 48 at the front and/or rear of the turntable assembly 24 may occur before, during, and/or after the transfer of impact energy into the lateral rails 40. As impact energy is transferred along a side-to-side width of the turntable assembly 24, the diagonal rails 48 that converge on the connecting plate 200 on a right side 212 of the turntable assembly 24 may begin to deform. Once all of the diagonal rails 48 have deformed, if impact energy must still be dissipated, then the lateral rails 40 begin to deform at an intermediate point along their length. In the event that impact energy remains after the lateral rails 40 have deformed, then the longitudinal rails 44 may begin to deform. The simulated impact event discussed above is intended for exemplary purposes only. The simulated impact event discussed above is not intended to be limiting. Of course, an impact event can occur in many different ways, and as such the above described impact event is intended merely as an example of the design and intent behind the structures discussed and described for the turntable assembly 24.

Referring now to FIGS. 7A-8B, the locking mechanism 52 is shown according to an additional or alternative example. In other words, the locking mechanism 52 depicted in these figures can be used in conjunction with the locking mechanism 52 described earlier with reference to FIGS. 2A and 2B or the locking mechanism 52 depicted in these figures can be used as an alternative to the locking mechanism 52 described earlier with reference to FIGS. 2A and 2B. The locking mechanism 52 depicted here engages with a connecting plate lock aperture 216 positioned in one or more of the connecting plates 200 (see FIG. 6). The locking mechanism 52 includes a T-shaped bolt 220. The T-shaped bolt 220 is defined by a vertical member 224 and a cross-member 228. The cross-member 228 is mounted to an upper end 232 of the vertical member 224 in a substantially perpendicular relationship. A bolt pin 236 may be coupled to a lower end 240 of the vertical member 224. Alternatively, the bolt pin 236 may be provided as a separate component from the T-shaped bolt 220 and the T-shaped bolt 220 may selectively engage with the bolt pin 236 when the turntable assembly 24 reaches a predetermined position that defines a rotational position (e.g., forward facing, rearward facing, or side facing). Actuating the T-shaped bolt 220 between an unlocked configuration (FIG. 7A) and a locked configuration (FIG. 7B) can be accomplished by at least one of rotational and vertical movement of the T-shaped bolt 220 relative to the turntable assembly 24. For example, the bolt pin 236 can engage with a slot 244 in the support structure 32 and/or the underbody 60. Transitioning between the unlocked configuration (FIG. 8A) and the locked configuration (FIG. 8B) can be accomplished by a ninety degree (90°) turn or quarter-turn of the T-shaped bolt 220 when the T-shaped bolt 220 is positioned above or generally co-localized with the slot 244.

According to various examples of the present disclosure, the turntable assembly 24 can be provided with a plurality of locked position configurations that designate a given rotational position. For example, two locked position configurations can be employed and may designate a forward-facing orientation of the seating assemblies 56 and a rearward-facing orientation of the seating assemblies 56. Alternatively, three locked position configurations can be employed and may designate a forward-facing orientation of the seating assemblies 56, a rearward-facing orientation of the seating assemblies 56, and a side-facing orientation of the seating assemblies 56. Further, four locked position configurations can be employed and may designate a forward-facing orientation of the seating assemblies 56, a rearward-facing orientation of the seating assemblies 56, a right side-facing orientation of the seating assemblies 56, and a left side-facing orientation of the seating assemblies 56. It is contemplated that a greater number of locked position configurations may be utilized without departing from the concepts disclosed herein. However, it is estimated that the forward-facing, rearward-facing, and side-facing orientations are likely to be the most sought after by the largest cross-section of users. The seating assemblies 56 may include one or more seating assemblies 56, such as a first seating assembly and a second seating assembly. The first and second seating assemblies can remain parallel to one another regardless of the rotational position of the turntable assembly 24.

It may be beneficial to manufacture the base 28 from a composite material so as to enable the possibility of molding complex structures into the base 28 rather trying to machine the complex structures into a material that requires more time and energy to manipulate, such as steel. While it is within the scope of the present disclosure to manufacture the base 28 from a material that requires more time and energy to manipulate, it may save time and energy to utilize a composite material instead that can be molded with the complex structures readily adopted by the composite material. Various composite materials can be utilized. In one example, a glass fiber composite can be utilized to manufacture the base 28, such as a glass fiber sheet molding composite. The base 28 may be between about one millimeter (1 mm) and about ten millimeters (10 mm) in thickness, between about two millimeters (2 mm) and about nine millimeters (9 mm) in thickness, between about three millimeters (3 mm) and about eight millimeters (8 mm) in thickness, between about four millimeters (4 mm) and about seven millimeters (7 mm) in thickness, between about five millimeters (5 mm) and about six millimeters (6 mm) in thickness, and/or combinations or ranges thereof. For example, the base 28 may be about one millimeter (1 mm) in thickness, about two millimeters (2 mm) in thickness, about three millimeters (3 mm) in thickness, about four millimeters (4 mm) in thickness, about five millimeters (5 mm) in thickness, about six millimeters (6 mm) in thickness, about seven millimeters (7 mm) in thickness, about eight millimeters (8 mm) in thickness, about nine millimeters (9 mm) in thickness, about ten millimeters (10 mm) in thickness, and/or combinations or ranges thereof.

The network of rails 36 may be manufactured from an extrudable metal. For example, the network of rails 36 can be extruded aluminum with a thickness of between about two millimeters (2 mm) and about nine millimeters (9 mm), between about three millimeters (3 mm) and about eight millimeters (8 mm), between about four millimeters (4 mm) and about seven millimeters (7 mm), between about five millimeters (5 mm) and about six millimeters (6 mm), and/or combinations or ranges thereof. For example, the network of rails 36 can be about two millimeters (2 mm) in thickness, about three millimeters (3 mm) in thickness, about four millimeters (4 mm) in thickness, about five millimeters (5 mm) in thickness, about six millimeters (6 mm) in thickness, about seven millimeters (7 mm) in thickness, about eight millimeters (8 mm) in thickness, about nine millimeters (9 mm) in thickness, and/or combinations or ranges thereof. The connecting plates 200 can be manufactured from a metallic material. For example, the connecting plates 200 can be manufactured from aluminum. In some examples, the connecting plates 200 can have a thickness of about 1.0 mm, about 1.5 mm, about 2.0 mm, about 2.5 mm, about 3.0 mm, about 3.5 mm, about 4.0 mm, about 4.5 mm, about 5.0 mm, about 5.5 mm, about 6.0 mm, and/or combinations or ranges thereof. Accordingly, in various examples, the turntable 24 can be a hybrid glass fiber and aluminum structure.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A turntable assembly for a vehicle, comprising:
   a base coupled to a support structure;
   a network of rails comprising lateral rails, longitudinal rails, and diagonal rails;
   a plurality of connecting plates positioned about a perimeter of the base, wherein the network of rails converge upon the plurality of connecting plates, and wherein the connecting plates are directly coupled to an end of at least one of the diagonal rails; and
   a locking mechanism coupled to the base and actuatable between engaged and disengaged positions with the support structure.

2. The turntable assembly for a vehicle of claim 1, further comprising:
   a closeout panel positioned as a top surface of the turntable assembly.

3. The turntable assembly for a vehicle of claim 1, further comprising:
   a collar that engages with at least one of the base and the support structure to provide a low friction surface for rotational motion of the turntable assembly.

4. The turntable assembly for a vehicle of claim 3, further comprising:
   a rotation mechanism that comprises a motor and a plurality of rollers, wherein the rollers passively rotate as the rotation mechanism imparts rotational motion to the turntable assembly.

5. The turntable assembly for a vehicle of claim 1, further comprising:
   one or more seating assemblies coupled to the network of rails.

6. The turntable assembly for a vehicle of claim 5, wherein the one or more seating assemblies are coupled to the network of rails by guide tracks, and wherein the seating assemblies are horizontally actuatable along the guide tracks relative to the network of rails.

7. A turntable assembly for a vehicle, comprising:
   a base coupled to a support structure;
   a network of rails converging on a plurality of connecting plates that are spaced about a perimeter of the base, wherein the plurality of connecting plates travel with the base when the base is actuated relative to the support structure; and
   a locking mechanism coupled to the base and actuatable between engaged and disengaged positions with the support structure.

8. The turntable assembly for a vehicle of claim 7, wherein the network of rails comprises lateral rails, longitudinal rails, and diagonal rails.

9. The turntable assembly for a vehicle of claim 7, further comprising:
a closeout panel positioned as a top surface of the turntable assembly.

10. The turntable assembly for a vehicle of claim 7, further comprising:
a collar that engages with at least one of the base and the support structure to provide a low friction surface for rotational motion of the turntable assembly.

11. The turntable assembly for a vehicle of claim 10, further comprising:
a rotation mechanism that comprises a motor and a plurality of rollers, wherein the rollers passively rotate as the rotation mechanism imparts rotational motion to the turntable assembly.

12. The turntable assembly for a vehicle of claim 7, further comprising:
one or more seating assemblies coupled to the network of rails.

13. The turntable assembly for a vehicle of claim 12, wherein the one or more seating assemblies are coupled to the network of rails by guide tracks, and wherein the seating assemblies are horizontally actuatable along the guide tracks relative to the network of rails.

14. A turntable assembly for a vehicle, comprising:
a support structure;
a base coupled to the support structure;
a collar that engages with the base to provide a low friction surface for rotational motion of the turntable assembly;
a closeout panel positioned as a top surface of the turntable assembly;
a plurality of connecting plates that are spaced about a perimeter of the base, wherein the plurality of connecting plates comprises a first pair of connecting plates and a second pair of connecting plates, and wherein the first pair of connecting plates are oriented along a first axis and the second pair of connecting plates are oriented along a second axis;
a network of rails comprising lateral rails, longitudinal rails, and diagonal rails, wherein the network of rails converge on the plurality of connecting plates; and
a locking mechanism coupled to the base and actuatable between engaged and disengaged positions with the support structure.

15. The turntable assembly for a vehicle of claim 14, further comprising:
a rotation mechanism that comprises a motor and a plurality of rollers, wherein the rollers passively rotate as the rotation mechanism imparts rotational motion to the turntable assembly.

16. The turntable assembly for a vehicle of claim 14, further comprising:
one or more seating assemblies coupled to the network of rails.

17. The turntable assembly for a vehicle of claim 16, wherein the one or more seating assemblies are coupled to the network of rails by guide tracks, and wherein the seating assemblies are horizontally actuatable along the guide tracks relative to the network of rails.

18. The turntable assembly for a vehicle of claim 17, wherein the one or more seating assemblies comprises a first seating assembly and a second seating assembly, and wherein the first and second seating assemblies remain parallel to one another regardless of a rotational position of the turntable assembly.

19. The turntable assembly for a vehicle of claim 14, wherein the first axis and the second axis are angularly offset from one another.

20. The turntable assembly for a vehicle of claim 14, wherein the first pair of connecting plates are diametrically opposed from one another at points along the first axis that intersect with the perimeter of the base, and wherein the second pair of connecting plates are diametrically opposed from one another at points along the second axis that intersect with the perimeter of the base.

* * * * *